(12) United States Patent
Liu et al.

(10) Patent No.: US 10,296,997 B2
(45) Date of Patent: May 21, 2019

(54) IMAGE-BASED INFORMATION ACQUISITION METHOD AND APPARATUS

(71) Applicant: BAIDU ONLINE NETWORK TECHNOLOGY (BEIJING) CO., LTD., Beijing (CN)

(72) Inventors: Jian Liu, Beijing (CN); Hao Li, Beijing (CN); Guoyi Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/504,287

(22) PCT Filed: Sep. 15, 2015

(86) PCT No.: PCT/CN2015/089587
§ 371 (c)(1),
(2) Date: Feb. 15, 2017

(87) PCT Pub. No.: WO2016/173180
PCT Pub. Date: Nov. 3, 2016

(65) Prior Publication Data
US 2018/0040094 A1 Feb. 8, 2018

(30) Foreign Application Priority Data

Apr. 29, 2015 (CN) .......................... 2015 1 0213849

(51) Int. Cl.
*G06K 9/00* (2006.01)
*G06T 1/00* (2006.01)
(Continued)

(52) U.S. Cl.
CPC .......... *G06T 1/0007* (2013.01); *G06F 16/434* (2019.01); *G06F 16/5866* (2019.01);
(Continued)

(58) Field of Classification Search
None
See application file for complete search history.

(56) References Cited

U.S. PATENT DOCUMENTS

| 7,450,960 B2 | 11/2008 | Chen |
| 2012/0259701 A1 | 10/2012 | Kumazawa et al. |

(Continued)

FOREIGN PATENT DOCUMENTS

| CN | 101216833 A | 7/2008 |
| CN | 101789111 | 7/2010 |

(Continued)

OTHER PUBLICATIONS

International Search Report from Application No. PCT/CN2015/089587 dated Feb. 2, 2016 (2 pgs).

*Primary Examiner* — Wei Wen Yang
(74) *Attorney, Agent, or Firm* — Knobbe Martens Olson & Bear LLP (57) ABSTRACT

The present application discloses an image-based information acquisition method and apparatus. The information acquisition method comprises: acquiring a first image; determining a second image matching the first image from a preset image library; presenting first information related to a commercial item if the second image is associated with commercial item information; and presenting second information related to a video if the second image is associated with video information. The information acquisition method of the present application can directly use images as references for acquiring information, thereby implementing the objective of improving information acquisition efficiency and accuracy.

10 Claims, 4 Drawing Sheets

(51) Int. Cl.
*G06F 16/432* (2019.01)
*G06F 16/951* (2019.01)
*G06F 16/58* (2019.01)
*G06F 16/783* (2019.01)
*G06F 17/30* (2006.01)
*G06Q 30/02* (2012.01)
*H04N 21/482* (2011.01)

(52) U.S. Cl.
CPC ........ *G06F 16/7837* (2019.01); *G06F 16/951* (2019.01); *G06F 17/30047* (2013.01); *G06F 17/3079* (2013.01); *G06F 17/30268* (2013.01); *G06F 17/30864* (2013.01); *G06Q 30/0256* (2013.01); *H04N 21/4828* (2013.01)

(56) References Cited

U.S. PATENT DOCUMENTS

| | | | | |
|---|---|---|---|---|
| 2014/0140638 | A1* | 5/2014 | Rathus | G06F 17/30247 |
| | | | | 382/305 |
| 2015/0220787 | A1* | 8/2015 | Folkens | G06F 17/30268 |
| | | | | 382/103 |
| 2017/0026574 | A1* | 1/2017 | Kwon | H04N 5/23238 |

FOREIGN PATENT DOCUMENTS

| | | |
|---|---|---|
| CN | 103369049 | 10/2013 |
| CN | 104765886 | 7/2015 |
| WO | WO 2012/083836 | 6/2012 |

\* cited by examiner

IMAGE-BASED INFORMATION ACQUISITION METHOD AND APPARATUS

CROSS-REFERENCE TO RELATED APPLICATIONS

This application is a U.S. national phase of PCT/CN2015/089587, filed on Sep. 15, 2015, which claims the benefit of Chinese Patent Application No. 201510213849.1, filed on Apr. 29, 2015 and entitled "IMAGE-BASED INFORMATION ACQUISITION METHOD AND APPARATUS," each of which is hereby incorporated by reference in its entirety.

TECHNICAL FIELD

The present application relates to the field of terminal technology, particularly, to the field of information acquisition technology, and more particularly to an image-based information acquisition method and apparatus.

BACKGROUND

With the rapid development of Internet technologies, resources and information on the Internet are becoming increasingly available. One can almost acquire any information she is interested in through online search. Generally, when searching on the Internet, a user needs first to determine a key word in the content of her interest, and then searches for the key word on the Internet to obtain related information. For example, when a user incidentally finds an interesting program on TV, and wants to watch the complete video of the program, the user generally needs to first determine a program name of the program, and then searches for the program name on the Internet to acquire the related video. Alternatively, when a user receives a product brochure, and wants to further enquire the function or price of the product, the user also needs to search for the product name on the Internet to acquire the related information.

It can be appreciated that, the method of acquiring information from the Internet in the prior art generally needs to determine a search key word, and then search the key word using a search engine to obtain the related information. This search procedure is relatively cumbersome, leading to low efficiency of the information acquisition. When the user cannot determine the search keyword or the determined search keyword is inaccurate, the accuracy of the acquired information may be affected.

SUMMARY

In view of the aforementioned disadvantages or defects in the existing art, there exists an expectation that a solution having a simple information acquisition approach and a high accuracy is provided. To implement the above one or more objectives, the present application provides an image-based information acquisition method and apparatus.

In the first aspect, the present application provides an image-based information acquisition method, comprising: acquiring a first image; determining a second image matching the first image from a preset image library; presenting first information related to a commercial item if the second image is associated with commercial item information; and presenting second information related to a video if the second image is associated with video information.

In the second aspect, the present application provides an image-based information acquisition apparatus, comprising: an image acquisition module, configured to acquire a first image; an image matching module, configured to determine a second image matching the first image from a preset image library; a first presentation module, configured to present first information related to a commercial item if the second image is associated with commercial item information; and a second presentation module, configured to present second information related to a video if the second image is associated with video information.

In the image-based information acquisition method and apparatus provided in the present application, a first image may be acquired first, a second image matching the first image may be acquired from a preset image library, first information related to a commercial item may be presented if the second image is associated with commercial item information, and second information related to a video may be presented if the second image is associated with video information. The present application can directly use images as references for acquiring information, and efficiency and accuracy of information acquisition are improved since the complicated process of searching information through keywords and possibly generated key word errors are avoided.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
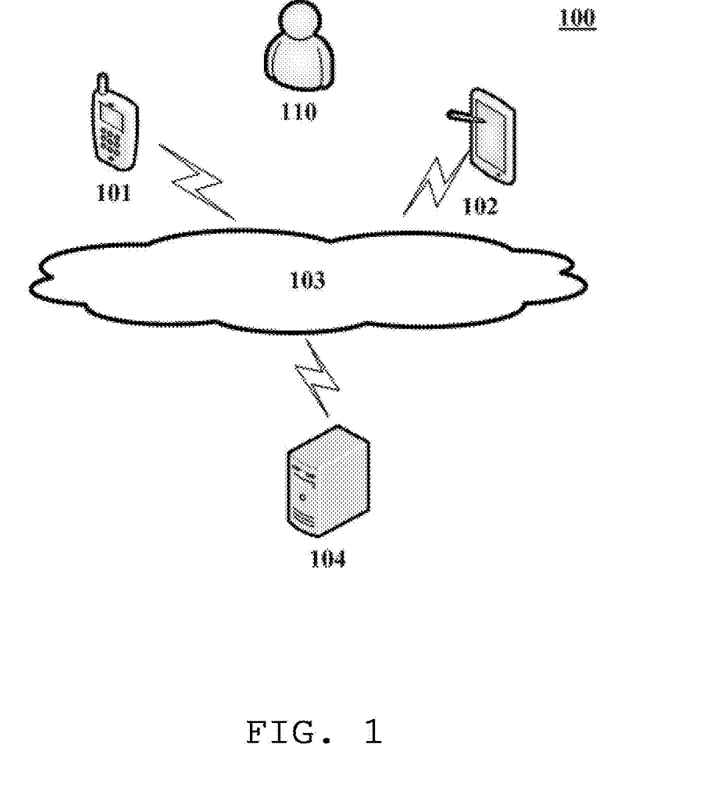
FIG. 1 is an exemplary system architecture 100 to which embodiments of the present application can be applied.

FIG. 1 shows an exemplary architecture of a system 100 which may be used by embodiments of the present application.

As shown in FIG. 1, the system architecture 100 may include terminal devices 101, and 102, a network 103 and a server 104. The network 103 serves as a medium providing a communication link between the terminal devices 101 and 102 and the server 104. The network 103 may include various types of connections, such as wired or wireless transmission links, or optical fibers.

The user may use the terminal devices 101 and 102 to interact with the server 104 through the network 103, in order to transmit or receive messages, etc. Various communication client applications, such as instant messaging tools, mailbox clients, social platform software, may be installed on the terminal devices 101 and 102.

The terminal devices 101 and 102 may be various electronic devices, including but not limited to, personal computers, smart phones, smart watches, tablet computers, personal digital assistants and wearable devices.

The server 104 may be a server providing various services. The storage server may perform storage or analysis processing on the received data, and return a processing result to the terminal devices.

It should be noted that the image-based information acquisition method according to the embodiments of the present application may be implemented in the terminal devices 101 and 102, may also be implemented in the server 104. The image-based information acquisition apparatus may be installed in the, an object data updating apparatus may be installed in the terminal devices 101 and 102, and may also be installed on the server 104.

It should be appreciated that the numbers of the terminal devices, the networks and the servers in FIG. 1 are merely illustrative. Any number of terminal devices, networks and servers may be provided based on the actual requirements.

Figure 2:
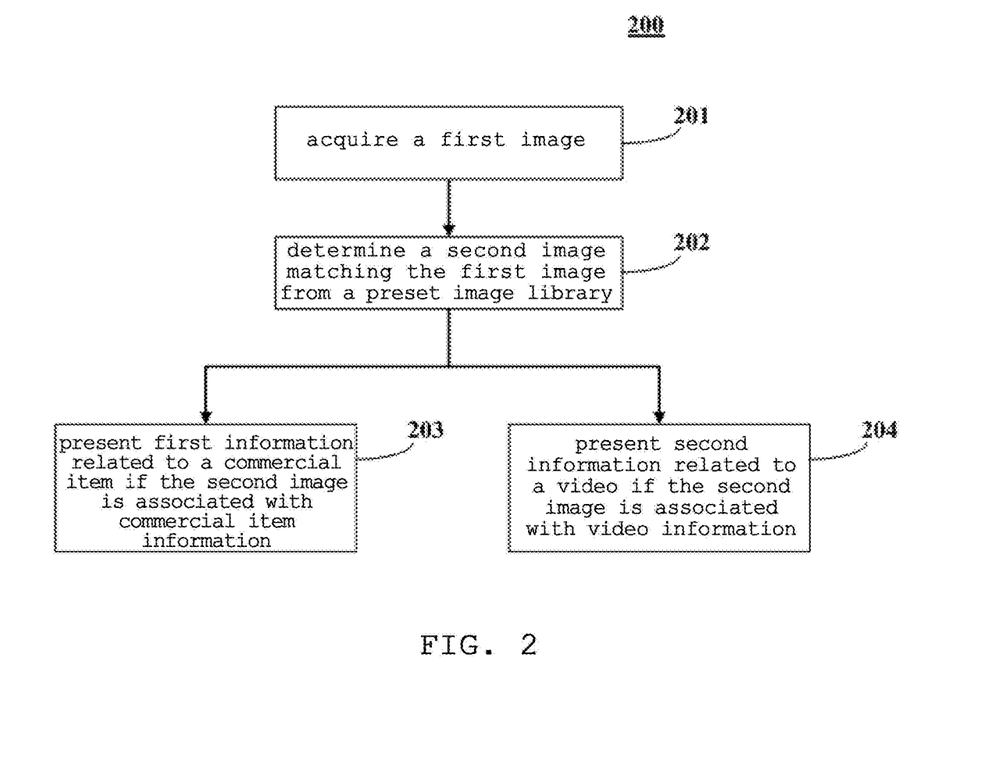
FIG. 2 is a flowchart of an embodiment of an image-based information acquisition method according to the present application.

Further referring to FIG. 2, in which a procedure 200 of an embodiment of an image-based information acquisition method according to the present application is shown.

As shown in FIG. 2, at step 201, a first image is acquired.

A terminal may first acquire a first image used for search, and the image may be related to content that a user expects to search for. For example, when the user intends to search for a movie, the first image may be a movie poster, or a scene in the movie. Specifically, the terminal may acquire the first image in various wired or wireless approaches. For example, the terminal may receive an image sent by another terminal through the network, and may also obtain a required image directly from the Internet. If the method in this embodiment is executed by a server, the server may acquire the first image by receiving an image sent by the terminal.

In an alternative implementation of this embodiment, the first image may be obtained by photographing or screen capturing. In a possible implementation, the user may take a photo on content of interest by using the terminal, and use the photo as the first image. For example, when the user watches an interesting TV program, the user may photograph the current TV picture directly by using the terminal. Alternatively, when the user passes by a billboard, the user may photograph the advertisement picture directly by using the terminal. Photos obtained by photographing may be used as the first image. In another possible implementation, the screenshot function of the terminal may be used, and a picture currently displayed by the terminal is used as the first image directly.

Then, at step 202, a second image matching the first image is determined from a preset image library.

After the first image is obtained from step 201, the first image may be searched for in a pre-constructed image library, such that a second image matching the first image is obtained. Optionally, after the first image is obtained, the first image may be pretreated first, such that a core image that needs to be searched for in the first image is extracted, and irrelevant interference images in the first image are removed. For example, when the first image is obtained by photographing a television screen, a picture displayed in the television screen may be extracted through pretreatment, and unnecessary image information outside the frame of the television is removed, such that the accuracy of subsequent image matching is improved. After the first image is pretreated, the pretreated first image may be matched to the image in the image library. Specifically, an image feature of the first image may be extracted first, for example, one or more of a color feature, a texture feature, a shape feature, and a space feature of the image. Then, the image feature of the first image is matched a corresponding feature of the image in the picture library. When the matching degree between an image feature of a certain image and the image feature of the first image reaches a certain threshold (for example, 80%), it may be determined that the image is the second image matching the first image.

Subsequently, at step 203, first information related to a commercial item is presented if the second image is associated with commercial item information.

After the second image is obtained at step 202, information associated with the second image may be further obtained. If the information is commercial item information, such as a commercial item name and a brand, it indicates that the first image is most possibly an image related to commercial item introduction or propaganda. When the user acquires information through this type of image, it may be considered that the user is interested in the commercial item itself, and therefore, first information related to the commercial item may be presented on an interface of the terminal. For example, an introduction page of the commercial item, a website home page of a manufacturer of the commercial item, or the like may be directly jumped to, or URLs of the network pages may be presented.

In an alternative implementation of this embodiment, the first information may include a sales page and/or a sales URL of the commercial item. An important reason why the user wants to acquire the related information of the commercial item is the generation of purchase intention on the commercial item, and therefore, this implementation may further provide the sales page and/or the sales URL of the commercial item for the user. Generally, there are multiple sales channels for the same commercial item, and therefore, different sales channels may be provided for the user to implement the purchase of the commercial item. In a possible implementation, a sales page having the highest credibility, for example, a direct selling page of a manufacturer, may be directly jumped to, to ensure the reliability of the purchase way to the maximum extent. In another possible implementation, sales URLs of various sales channels may be presented for the user to choose, so that the user chooses a suitable purchase way. In still another possible implementation, a sales page having the highest credibility may be directly jumped to, and sales URLs of other sales channels are presented at the same time; in this way, not only the most reliable purchase way is provided for the user, but also other optional purchase ways are further provided, thus facilitating screening and comparison by the user. The sales pages or URLs of the commercial item are provided to the user, thereby further improving the comprehensiveness of information acquisition.

At step 204, which parallels step 203, second information related to a video is presented if the second image is associated with video information.

After the second image is obtained at step 202, information associated with the second image may be further obtained. If the information is video information, such as a video name and a type, it indicates that the first image is most likely an image related to a certain video. When the user acquires information through this type of image, it may be considered that the user is interested in the video, and therefore, second information related to the video may be presented on an interface of the terminal. For example, a plot introduction page, a network comment page, or the like of the video may be directly jumped to, or URLs of the network pages may be presented.

In an alternative implementation of this embodiment, the second information may include a playback page and/or a playback URL of the video. An important reason why the user wants to acquire the related information of the video is that the user intends to watch specific content of the video, and therefore, this implementation may further provide the playback page and/or the playback URL of the video for the user. There are generally multiple online playback URLs for the same video, and therefore, multiple different watching ways may be provided for the user to watch the video. For example, a playback page having the highest video quality may be directly jumped to, or multiple playback URLs may be directly provided for the user to choose, or other playback URLs may be provided for the user to choose at the same time when a default playback page is jumped to. The playback pages or URLs of the video are provided to the user, thereby further improving the comprehensiveness of information acquisition.

It should be noted that, when the second image is associated with good information and video information at the same time, for example, when the second image is a screenshot of a video advertisement of a certain commercial item, the terminal may present a playback URL of the advertisement video and a sales URL of the commercial item at the same time, such that the user may open a corresponding web page according to her own actual requirements. The terminal may also present the playback URL of the advertisement video on the sales page of the commercial item, or present the sales URL of the commercial item on the playback URL of the video. Specific presentation forms of the first information and the second information are not limited in the present application.

In the image-based information acquisition method provided in this embodiment, a first image may be acquired firstly, a second image matching the first image may be acquired from a preset image library, first information related to a commercial item may be presented if the second image is associated with commercial item information, and second information related to a video may be presented if the second image is associated with video information. The present application can directly use images as references for acquiring information, and efficiency and accuracy of information acquisition are improved since the complicated process of searching information through keywords and possibly generated key word errors are avoided.

Figure 3:
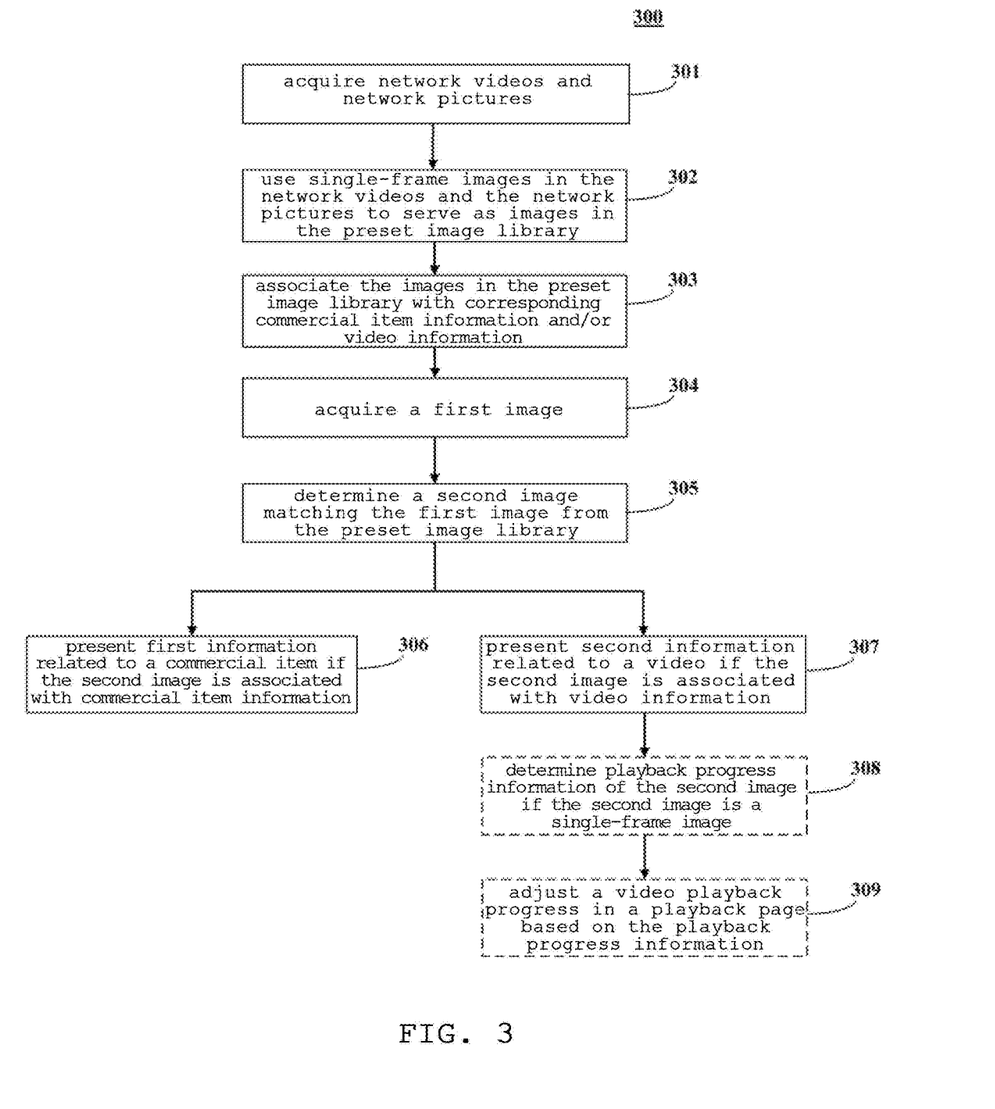
FIG. 3 is a flowchart of another embodiment of the image-based information acquisition method according to the present application.

FIG. 3 shows a flowchart 300 of another embodiment of an image-based information acquisition method according to the present application.

As shown in FIG. 3, at step 301, network videos and network pictures are acquired.

In this embodiment, a great number of network videos and network pictures may be acquired firstly, to serve as materials for constructing a preset image library. To ensure the comprehensiveness and richness of the image library, various types of videos and pictures may be acquired as many as possible. Specifically, network videos may be acquired from various video websites, and network pictures may also be acquired from various websites.

Subsequently, at step 302, single-frame images in the network videos and the network pictures are used to serve as images in the preset image library.

After the network videos and network pictures are acquired at step 301, not only the network pictures may be directly used as images in the preset image library, but also single-frame images may be extracted from the network videos to serve as images in the preset image library. As each video is obtained by sorting many frames of images based on a time sequence, each frame of image in the network videos may be directly used as an image in the image library. In a possible implementation, to reduce the data size of the image library and improve the efficiency of subsequent image matching, single-frame images in the network videos may be extracted according to a certain frequency, for example, 1 frame/second, to serve as the images in the image library. Alternatively, representative single-frame images in the network videos, i.e., key frames, may also be extracted through a method such as a pixel frame average method or a histogram frame average method, to serve as the images in the image library.

Then, at step 303, the images in the preset image library are associated with corresponding commercial item information and/or video information.

In this embodiment, after the images in the preset image library are obtained at step 302, associated information may be further configured for the images based on sources and displayed content of the images. Specifically, when the images are single-frame images extracted from the network videos, video information related to the network videos may be used as the associated information of the images. Further, when the videos are promotion videos (such as advertisement videos) for promoting certain commercial items, information of the commercial items may be further associated with the images. When the images are derived from network pictures, information associated with the images may be determined based on image content displayed. For example, when the image is a movie poster, a movie name may be associated with the image; and when the image is a print advertisement, the name of the advertised commercial item may be associated with the image.

It should be noted that, commercial item information in this embodiment may be critical commercial item information such as a commercial item name and a brand. Alternatively, the commercial item information may further include URLs of an introduction page of the commercial item, a website home page of a manufacturer of the commercial item, a sales page of the commercial item, and the like. The video information in this embodiment may be critical video information such as a video name, a release date, and a director. Alternatively, the video information may further include URLs of a plot introduction page, a network comment page, a network playback page, and the like of the video.

Subsequently, at step 304, a first image is acquired.

Then, at step 305, a second image matching the first image is determined from the preset image library.

The steps 304 to 305 are identical to steps 201 to 202 in FIG. 2, thus being not repeated herein.

Subsequently, at step 306, first information related to a commercial item is presented if the second image is associated with commercial item information.

In this embodiment, when the commercial item information includes the critical commercial item information, the terminal searches for the critical commercial item information in the Internet, and presents the introduction page of the commercial item, the website home page of a manufacturer of the commercial item, and the sales page of the commercial item that are searched out or URLs of the pages as the first information. When the commercial item information further includes the URLs of the introduction page of the commercial item, the website home page of a manufacturer of the commercial item, and the sales page of the commercial item, the commercial item information may be directly presented as the first information. The commercial item information is obtained by screening when the image library is constructed, and therefore, the commercial item information has a higher reliability when being used as the first information.

At step 307 parallel to step 306, second information related to a video is presented if the second image is associated with video information.

In this embodiment, when the video information includes the critical video information, the terminal searches for the critical video information in the Internet, and presents the plot introduction page, the network comment page, the network playback page, and the like of the video that are searched out or URLs of the pages as the second information. When the video information further includes the URLs of the plot introduction page, the network comment page, the network playback page, and the like of the video, the video information may be directly presented as the second information. The video information is obtained by screening when the image library is constructed, and therefore, the video information has a higher reliability when being used as the second information.

Alternatively, when the second image is a single-frame image in the video, a playback progress of the video may be further determined. Specifically:

At step 308, playback progress information of the second image is determined if the second image is a single-frame image.

The video is obtained by arranging single-frame images according to a time sequence. Therefore, when the second image is a single-frame image extracted from the video, a playback progress of the video represented by the second image, i.e., playback progress information of the second image, may be obtained based on a position of the second image in an image sequence constructing the whole video.

At step 309, a video playback progress in the playback page is adjusted based on the playback progress information.

After the playback progress information of the second image is obtained at step 308, if the second information presented by the terminal is the playback page of the video, the playback progress of the video may be adjusted to a position indicated by the playback progress information, i.e., the moment when the second image appears in the video. In this way, the video presented by the terminal may be directly positioned to the position where a specific picture is located, thereby avoiding the user from manually searching for a picture in the video, and further improving the accuracy of information acquisition.

It should be noted that, operations of the method in the present invention are described in a specific sequence in the accompanying drawings; however, this does not require or imply that the operations must be executed based on the specific sequence, or that an expected result cannot be implemented unless all of the shown operations are executed. In contrast, the steps depicted in the flowchart may be executed in a changed sequence. Additionally or alternatively, some steps may be omitted, multiple steps may be combined into one step for execution, and/or one step may be broken down into multiple steps for execution.

Figure 4:
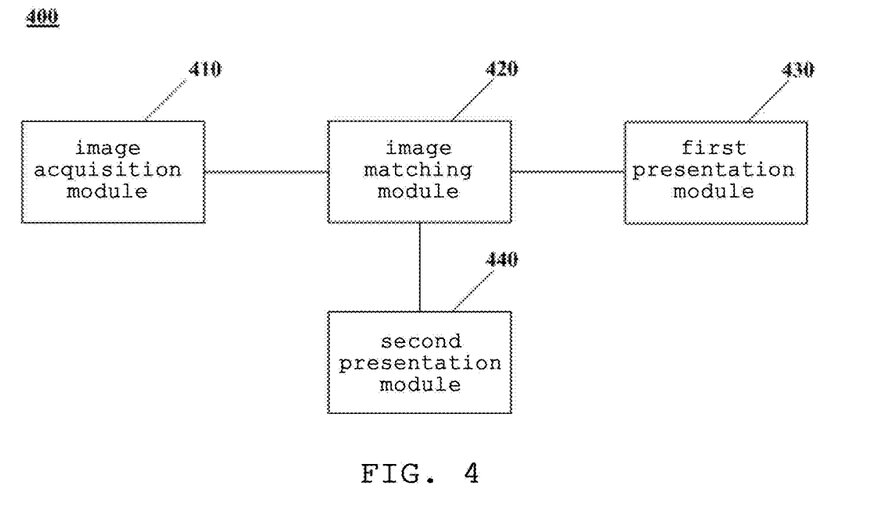
FIG. 4 is a schematic architectural diagram of function modules of an embodiment of an image-based information acquisition apparatus according to the present application.

Further referring to FIG. 4, a schematic architectural diagram of function modules of an embodiment of an image-based information acquisition apparatus is shown.

As shown in FIG. 4, an image-based information acquisition apparatus 400 of this embodiment includes: an image acquisition module 410, an image matching module 420, a first presentation module 430, and a second presentation module 440.

The image acquisition module 410 is configured to acquire a first image;

the image matching module 420 is configured to determine a second image matching the first image acquired by the image acquisition module 410 from a preset image library;

the first presentation module 430 is configured to present first information related to a commercial item when the second image obtained by the image matching module 420 is associated with commercial item information; and The second presentation module 440 is configured to present second information related to a video when the second image obtained by the image matching module 420 is associated with video information.

In an alternative implementation of this embodiment, the first information includes a sales page and/or a sales URL of the commercial item.

In an alternative implementation of this embodiment, the second information includes a playback page and/or a playback URL of the video.

In an alternative implementation of this embodiment, the information acquisition apparatus further includes:

an acquisition module, configured to acquire a network video and a network picture;

a construction module, configured to use a single-frame image in the network video and the network picture acquired by the acquisition module to serve as images in the preset image library; and an association module, configured to associate the image in the preset image library with corresponding commercial item information and/or video information.

In an alternative implementation of this embodiment, the information acquisition apparatus further includes:

a progress determination module, configured to determine playback progress information of the second image when the second image is a single-frame image; and a progress adjustment module, configured to adjust a video playback progress in the playback page based on the playback progress information determined by the progress determination module.

In an alternative implementation of this embodiment, the image acquisition module 410 acquires the first image by photographing or screen capturing.

In the image-based information acquisition apparatus provided in this embodiment, an image acquisition module may acquire a first image firstly, then an image matching module may acquire a second image matching the first image from a preset image library, a first presentation module may present first information related to a commercial item if the second image is associated with commercial item information, and a second presentation module may present second information related to a video if the second image is associated with video information. The present application can directly use images as references for acquiring information, and efficiency and accuracy of information acquisition are improved since the complicated process of searching information through keywords and possibly generated key word errors are avoided.

Figure 5:
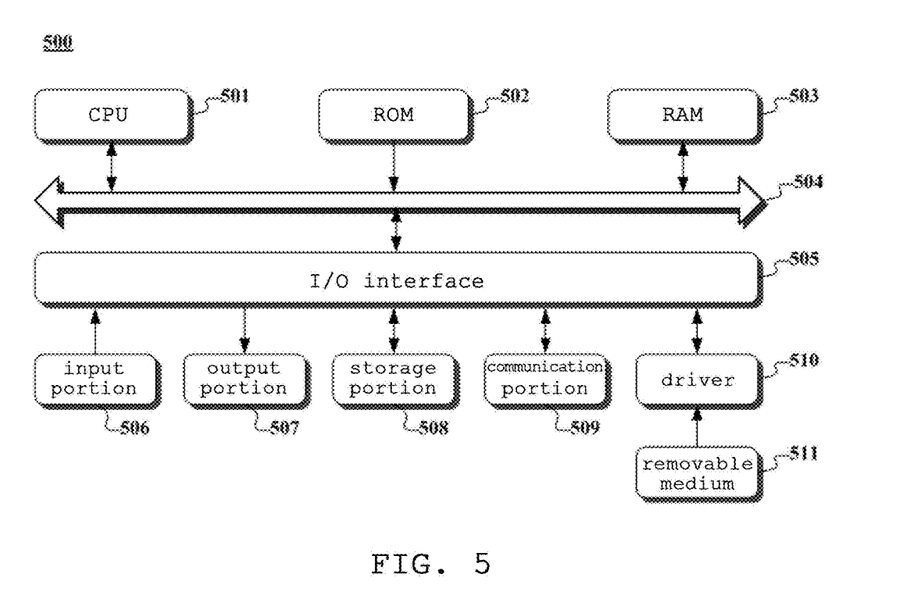
FIG. 5 is a schematic structural diagram of a computer system 500 of a terminal device or a server applicable to implement the embodiments of the present application.

Referring to FIG. 5, a schematic structural diagram of a computer system 500 adapted to implement a terminal apparatus or a server of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The modules involved in the embodiments of the present application may be implemented by way of software or hardware. The described units or modules may also be provided in a processor, for example, described as: a processor, comprising an image acquisition module, an image matching module, a first presentation module, and a second presentation module, where the names of these modules are not considered as a limitation to the modules. For example, the image acquisition module may also be described as "a module for acquiring a first image."

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs are used by one or more processors to implement the image-based information acquisition method as described in the preset application.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. An image-based information acquisition method, comprising:
   acquiring a first image;
   determining a second image matching the first image from a preset image library;
   presenting first information related to a commercial item if the second image is associated with commercial item information; and
   presenting second information related to a video if the second image is associated with video information,
   wherein the method further comprises:
   acquiring a network video and a network picture;
   using a single-frame image in the network video and the network picture to service as images in the preset image library; and
   associating the image in the preset image library with corresponding commercial item information or video information;
   determining playback progress information of the second image if the second image is a single-frame image; and
   adjusting a video playback progress in the playback page based on the playback progress information.

2. The method according to claim 1, wherein the first information comprises a sales page or a sales URL of the commercial item.

3. The method according to claim 1, wherein the second information comprises a playback page or a playback URL of the video.

4. The method according to claim 1, wherein the first image is obtained by photographing or screen capturing.

5. An image-based information acquisition apparatus, comprising:
   an image acquisition module, configured to acquire a first image;

an image matching module, configured to determine a second image matching the first image from a preset image library;

a first presentation module, configured to present first information related to a commercial item when the second image is associated with commercial item information; and a second presentation module, configured to present second information related to a video when the second image is associated with video information:, wherein the apparatus further comprises:

an acquisition module, configured to acquire a network video and a network picture;

a construction module, configured to use a single-frame image in the network video and the network picture to serve as images in the preset image library;

an association module, configured to associate the image in the preset image library with corresponding commercial item information or video information;

a progress determination module, configured to determine playback progress information of the second image when the second image is a single-frame image; and a progress adjustment module, configured to adjust a video playback progress in the playback page based on the playback progress information.

6. The apparatus according to claim 5, wherein the first information comprises a sales page or a sales URL of the commercial item.

7. The apparatus according to claim 5, wherein the second information comprises a playback page or a playback URL of the video.

8. The apparatus according to claim 5, wherein the image acquisition module acquires the first image by photographing or screen capturing.

9. A device, comprising:
one or more processors;
a memory; and
one or more programs being stored in the memory, the one or more programs when executed by the one or more processors cause the one or more processors to:
acquire a first image;
determine a second image matching the first image from a preset image library;
present first information related to a commercial item if the second image is associated with commercial item information; and
present second information related to a video if the second image is associated with video information:,
acquire a network video and a network picture;
use a single-frame image in the network video and the network picture to serve as images in the preset image library;
associate the image in the preset image library with corresponding commercial item information or video information;
determine playback progress information of the second image if the second image is a single-frame image; and
adjust a video playback progress in the playback page based on the playback progress information.

10. A non-transitory computer storage medium storing one or more programs that when executed by a device, cause the device to:
acquire a first image;
determine a second image matching the first image from a preset image library;
present first information related to a commercial item if the second image is associated with commercial item information;
present second information related to a video if the second image is associated with video information;
acquire a network video and a network picture;
use a single-frame image in the network video and the network picture to serve as images in the preset image library; and
associate the image in the preset image library with corresponding commercial item information or video information;
the one or more programs are further configured to:
determine playback progress information of the second image if the second image is a single-frame image; and
adjust a video playback progress in the playback page based on the playback progress information.

* * * * *